No. 801,720. PATENTED OCT. 10, 1905.
J. E. KELLER, Jr.
INFLATION VALVE.
APPLICATION FILED JULY 16, 1904.
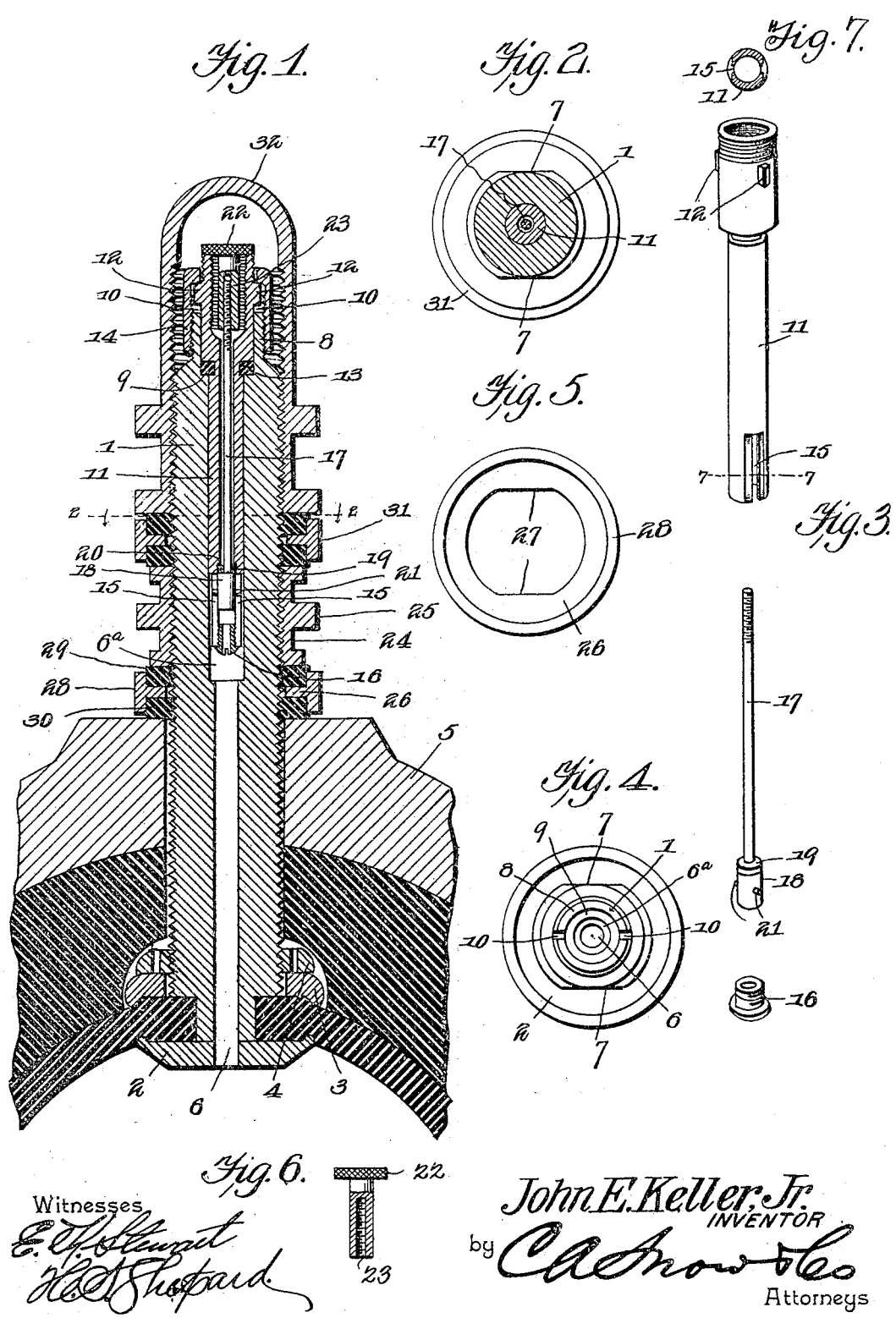

UNITED STATES PATENT OFFICE.

JOHN E. KELLER, JR., OF LITCHFIELD, CONNECTICUT.

INFLATION-VALVE.

No. 801,720.  Specification of Letters Patent.  Patented Oct. 10, 1905.

Application filed July 16, 1904. Serial No. 216,857.

*To all whom it may concern:*

Be it known that I, JOHN E. KELLER, Jr., a citizen of the United States, residing at Litchfield, in the county of Litchfield and State of Connecticut, have invented a new and useful Inflation-Valve, of which the following is a specification.

This invention relates to inflation-valves particularly designed for pneumatic tires.

It is an object of the present invention to provide a novel water and air tight connection between the tubular stem of the valve and the rim of the tire and to facilitate the application and removal of the same.

Another object of the invention is to simplify the construction of the valve mechanism, so as to insure prompt and effective operation thereof without liability of the valve becoming choked, and to provide for the convenient assemblage and removal of the valve whenever desired. In this connection it is also designed to provide for mechanically seating the valve so as to effectually prevent leakage thereof and to facilitate the unseating of the valve to insure an effective working thereof, particularly when it is desired to inflate the tire.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a longitudinal sectional view of an inflation-valve constructed in accordance with the present invention. Fig. 2 is a cross-sectional view on the line 2 2 of Fig. 1. Fig. 3 is a detail perspective view of the valve mechanism removed from the tubular stem. Fig. 4 is a top plan view of the tubular stem or casing. Fig. 5 is a plan view of one of the washers. Fig. 6 is a detail sectional view of the device for mechanically seating the valve. Fig. 7 is a cross-sectional view on the line 7 7 of Fig. 3.

Like characters of reference designate corresponding parts in each and every figure of the drawings.

The present valve includes a tubular open-ended casing or stem 1, which is provided at its inner end with the usual flange 2 for coöperation with the washer 3 and the nut 4 to clamp upon the inner tube of a tire so as to connect the valve-stem therewith, said stem of course being projected through the rim 5 in the usual manner. The bore portion 6 of the inner end of the stem or casing is somewhat smaller than the outer bore portion $6^a$ in order that the walls of the stem or casing may be relatively thick where the stem passes through the rim, whereby its strongest point may enter the rim and receive the strains. This stem is externally screw-threaded from end to end and is provided at opposite sides with corresponding longitudinal flat faces 7, and the outer extremity of the stem or casing is reduced in external diameter, as indicated at 8, for a purpose as will hereinafter appear, while the interior of this reduced portion is slightly enlarged, so as to form an inner annular seat or shoulder 9, and in the outer end of the part 8 are diametrically opposite notches or seats 10.

Within the bore portion $6^a$ of the tubular stem or casing is located the valve mechanism, which consists of the valve-tube 11, open at opposite ends and having its outer end screw-threaded internally and externally for connection with air-pumps, with its internal diameter increased at its outer end and provided with diametrically opposite external lugs or projections 12 to enter the notches 10 and prevent rotation of the valve-tube. A packing-ring or washer 13 is seated in a groove at the inner side of the projection 12, so as to engage the inner annular shoulder 9 of the tubular valve-stem and form an air-tight joint at this point when the retaining-cap 14 has been engaged with the lugs or projections 12 of the valve-tube and the reduced outer terminal 8 of the valve-stem. The lower end of the valve-tube 11 is open and provided with diametrically opposite bifurcations 15, with a tubular screw-threaded plug 16 removably fitted into the open lower end of the tube. Within the valve-tube is the valve-stem 17, the upper end of which is screw-threaded and projected into the enlarged bore portion at the outer end of the tube, while its inner end is enlarged, as at 18, to form a valve head or body, with a washer or packing-ring 19 embracing the stem at the inner end of the head and capable of being engaged with a valve-seat 20, formed within the valve-tube 11 beyond the inner ends of the bifurcations 15.

It will here be explained that the valve and its stem are inserted through the inner end of the valve-tube, with the guide projections 21 entered into the bifurcations 15, so as to prevent rotation of the valve-stem, the plug 16 being afterward fitted in place, so as to prevent displacement of the valve while at the same time permitting of the free passage of air through the valve-tube. At the outer end of the valve-tube there is a cap or closure consisting of a disk-like head 22, having a milled peripheral edge to facilitate turning thereof and provided with a tubular stem 23, which is internally screw-threaded and receives the outer screw-threaded end of the valve-stem 17. When the cap 22 is screwed down upon the stem 17 into engagement with the outer end of the valve-tube 11, the outer end of said tube will be closed, and at the same time the stem will be drawn outwardly, so as to mechanically seat the valve 19, and thereby insure an air-tight closure of the valve independently of the pressure of the air. To inflate the tire, the cap 22 is backed off from the valve-tube 11 and then pressed inwardly, so as to unseat the valve for the purpose of breaking any adhesion which may occur between the valve and its seat, after which the cap may be entirely removed and the pump then connected to the valve-tube. Upon replacing the cap the valve will again be mechanically seated and maintained seated so long as the cap is in place, which insures an air-tight seating of the valve. Access may be conveniently had to the valve mechanism by removing the retaining-cap 14, which permits of the valve-tube 11 being readily withdrawn from the valve-stem 1, whereupon the plug 16 may be removed and the valve taken out for repairs.

It will here be noted that the slots 15 are formed by externally reducing opposite sides of the lower terminal of the valve-tube 11 and then forming the slots or bifurcations in the reduced portions of the tube. The importance of this feature will be understood by reference to Fig. 1, wherein it will be observed that the opening through the plug 16 will be closed by the valve 18 during inflation of the tire, and therefore little or no air would pass through this plug. By reason of the external reduction of the tube at opposite sides at the point where the slots are formed there will be spaces between the slotted walls of the tube and the tubular stem 1 sufficient to permit of the incoming air passing outwardly through the slots and thence through the spaces between the valve-tube and the stem into the interior of the latter. With the exception of the reduced slotted portion the valve-tube 11 fits snugly throughout its length within the bore of the tubular stem 1, thereby to prevent looseness and rattling of the valve-tube. By externally reducing the slotted inner end portion of the valve-tube 11 there is sufficient space between the walls of the bore of the tubular stem 1 and the exterior of the tube 11 to prevent material friction of the incoming air upon the exterior of the valve-tube and the interior of the valve-stem, thus preventing heating and consequent expansion and contraction of these parts, wherefore the proper fit of the valve-tube within the tubular stem is maintained.

To connect the tubular valve-stem 1 to the rim of the wheel, there is provided a nut 24, which is screwed upon the stem and has an intermediate milled flange 25 for convenience in applying and removing the nut. Interposed between the nut and the rim is a washer 26, having a central opening provided with diametrically opposite flat walls 27 and also provided with an external annular flange 28, which projects at opposite sides of the washer. Flexible packing-rings 29 and 30 are applied to opposite sides of the washer, each ring being of a thickness to project beyond the flange, so as to bear, respectively, against the rim 5 and the inner end of the nut 24, thereby to form a water and air tight joint at the point where the tubular stem 1 pierces the rim of the wheel. A similarly-constructed washer 31 is applied to the outer end of the nut 24, and a dust-cap 32 is fitted upon the outer extremity of the stem, so as to engage the screw-threaded portion thereof and bear against the washer 31, thereby to protect the valve mechanism and at the same time operate to lock the nut 24 against accidental loosening. It will here be explained that the outer extremity 8 of the valve-stem 1 is reduced in diameter to accommodate the retaining-cap 14 in order that the latter may not interfere with the application of the dust-cap 32.

Having thus described the construction and operation of my invention, what I claim as new, and desire to secure by Letters Patent, is—

1. An inflation-valve including an externally-screw-threaded tubular stem for insertion through a rim and provided with an external longitudinal flat portion, valve mechanism within the stem, a nut fitted upon the stem for engagement with the rim, locking-washers embracing the stem at opposite sides of the nut and provided with flattened portions engaging the flat portion of the stem to prevent rotation of the washers, and a dust-cap fitted to the outer end of the stem and engaging the outer washer to prevent looseness thereof.

2. An inflation-valve comprising a tubular externally-screw-threaded stem provided with a flat longitudinal portion, a nut fitted upon the stem, locking-washers fitted to the stem at opposite sides of the nut for engagement therewith, each washer having a flattened inner edge portion to engage the flat portion of the stem and provided with an outer annular flange projected at opposite sides of the washer, packing-rings fitted to opposite sides of each washer and projected beyond the opposite edges of the flange thereof, and a dust-cap embracing the outer end of the stem and engaged with the outer washer to prevent looseness thereof.

3. An inflation-valve comprising a tubular stem for insertion through a rim with its outer end portion externally reduced, valve mechanism including a valve-tube fitted in the stem and projected at the outer end thereof, a retaining-cap engaging the projected portion of the valve-tube and connected to the reduced outer terminal of the stem with its exterior lying within the outer periphery of the stem, and a dust-cap surrounding the retaining-cap and connected to the outer portion of the stem.

4. An inflation-valve including an external tubular stem for insertion through a rim and provided with an external longitudinal flat portion, valve mechanism within the stem, rim-engaging means embracing the stem and provided with an internal flat portion to engage the flat portion of the stem, and an internally-threaded dust-cap engaging the threaded stem and bearing against the rim-engaging member to prevent looseness thereof.

5. An inflation-valve comprising a tubular stem which is externally threaded and has an external longitudinal flattened portion, a washer embracing the stem and provided with a flattened inner peripheral portion to engage the flattened portion of the stem and prevent rotation of the washer, said washer being provided at opposite sides with annular rims, packing-rings fitted within the rims and projected beyond the same, and an internally-threaded dust-cap fitted upon the stem to bear against one of the packing-rings and force the other packing-ring against an opposing surface to be packed.

In testimony that I claim the foregoing as my own I have hereto affixed my signature in the presence of two witnesses.

JOHN E. KELLER, JR.

Witnesses:
ANSON F. GRANNISS,
CHARLES H. COIT.